(12) United States Patent
Olsen (10) Patent No.: US 12,502,310 B2
(45) Date of Patent: Dec. 23, 2025

(54) TISSUE GRAFT FIXTURE

(71) Applicant: iMacular Regeneration LLC, Rochester, MN (US)

(72) Inventor: Timothy W. Olsen, Rochester, MN (US)

(73) Assignee: iMacular Regeneration LLC, Rochester, MN (US)

( * ) Notice: Subject to any disclaimer, the term of this patent is extended or adjusted under 35 U.S.C. 154(b) by 228 days.

(21) Appl. No.: 17/923,174

(22) PCT Filed: Jul. 13, 2021

(86) PCT No.: PCT/US2021/041424
§ 371 (c)(1),
(2) Date: Nov. 3, 2022

(87) PCT Pub. No.: WO2022/015727
PCT Pub. Date: Jan. 20, 2022

(65) Prior Publication Data
US 2023/0157871 A1    May 25, 2023

Related U.S. Application Data

(60) Provisional application No. 63/052,245, filed on Jul. 15, 2020.

(51) Int. Cl.
*A61F 9/007*    (2006.01)

(52) U.S. Cl.
CPC .. *A61F 9/00727* (2013.01); *A61F 2210/0019* (2013.01); *A61F 2230/0065* (2013.01); *A61F 2240/001* (2013.01)

(58) Field of Classification Search
CPC .......... A61F 9/00727; A61F 2210/0019; A61F 2230/0065; A61F 2240/001; A61F 2220/0091
See application file for complete search history.

(56) References Cited

U.S. PATENT DOCUMENTS

| 3,378,010 A | 4/1968 | Codling et al. |
| 3,856,016 A | 12/1974 | Davis |

(Continued)

FOREIGN PATENT DOCUMENTS

| EP | 2504042 | 5/2024 |
| WO | WO-2022015727 A1 | 1/2022 |

OTHER PUBLICATIONS

"International Application Serial No. PCT/US2021/041424, International Search Report mailed Sep. 29, 2021", 2 pgs.

(Continued)

*Primary Examiner* — Richard G Louis
(74) *Attorney, Agent, or Firm* — Schwegman Lundberg & Woessner, P.A.

(57) ABSTRACT

A fixture includes a first ring member and a second ring member. The first ring member has a first open center and has a first tool connector disposed at a first radial position relative to the first open center. The second ring member has a second open center coupled to the first ring member at a joint. The joint is disposed at a second radial position relative to the first open center. The joint has a second tool connector. The joint is configured to enable movement of the first ring member relative to the second ring member.

28 Claims, 4 Drawing Sheets

(56) References Cited

U.S. PATENT DOCUMENTS

| | | | | |
|---|---|---|---|---|
| 5,352,183 | A * | 10/1994 | Jonsson | A61F 2/00 |
| | | | | 600/32 |
| 5,441,509 | A * | 8/1995 | Vidal | A61B 17/1285 |
| | | | | 24/703.1 |
| 5,609,599 | A * | 3/1997 | Levin | A61B 17/122 |
| | | | | 606/151 |
| 6,402,765 | B1 | 6/2002 | Monassevitch et al. | |
| 9,539,082 | B2 * | 1/2017 | Olsen | A61F 2/14 |
| 10,278,808 | B2 | 5/2019 | Olsen et al. | |
| 2005/0043757 | A1 * | 2/2005 | Arad | A61B 17/083 |
| | | | | 606/200 |
| 2012/0259404 | A1 * | 10/2012 | Tieu | A61F 2/88 |
| | | | | 623/1.15 |
| 2015/0018806 | A1 * | 1/2015 | Olsen | A61F 9/00727 |
| | | | | 606/4 |

OTHER PUBLICATIONS

"International Application Serial No. PCT/US2021/041424, Written Opinion mailed Sep. 29, 2021", 6 pgs.

"International Application Serial No. PCT/US2021/041424, International Preliminary Report on Patentability mailed Jan. 26, 2023", 8 pgs.

* cited by examiner

TISSUE GRAFT FIXTURE

PRIORITY CLAIM

This application is a U.S. National Stage Filing under 35 U.S.C. 371 from International Application No. PCT/US2021/041424, filed Jul. 13, 2021 and published in English as WO 2022/015727 on Jan. 20, 2022, 2022, which claims the benefit of priority to U.S. Provisional Patent Application Ser. No. 63/052,245, filed Jul. 15, 2020, each of which is incorporated herein by reference in its entirety.

GOVERNMENT SUPPORT CLAUSE

This invention was made with government support under Grant No. R41 EY028803 awarded by the National Institutes of Health (NIH), National Eye Institute (NEI). The government has certain rights in the invention.

TECHNICAL FIELD

This document pertains generally, but not by way of limitation, to a device for processing and manipulating a membrane.

BACKGROUND

One example of a debilitating eye disease is known as age-related macular degeneration (AMD). AMD typically causes blurred and/or impaired central vision and is a leading cause of blindness. Treatment options are limited and include drug therapy. Future stem cell therapeutic options are being studied. Treatment outcomes often fail, and the degeneration progresses despite therapy.

SUMMARY

An example of a surgical treatment includes either translocation surgery, a choroid patch graft, or stem cell construct, any may use autologous tissue to regenerate the macula. Current procedures are complicated by the limited ability to translocate healthy tissue and the elasticity and fragility of donor tissue. Choroid tissue is elastic, contracts, and is easily damaged during surgical manipulation for either of these procedures.

Approaches to overcome challenges associated with macular translocation include U.S. Pat. No. 10,278,808 which refers to a surgical support structure and U.S. Pat. No. 9,539,082 which refers to a tissue support structure.

Persistent challenges remain. For example, proper placement of a support structure is complicated by the challenging intraocular working environment. In addition, the translocation procedure requires the support structure be gently excised and moved to a new location. During these microsurgical manipulations, fine movements may result in tissue damage, contraction, and loss of function. In order to minimize tissue trauma, choroidal tissue is clamped between a support structure to facilitate tissue integrity (avoids contraction), maintain tissue orientation, and limits forceps-injury to the delicate choroidal tissues (supported with the clamp). Thus, proper alignment and placement of this clamp for donor tissue is addressed with an example of the present subject matter. One example of the present subject matter will enable intraocular clamping of autologous tissue, inside the eye, for translocation to the target location while minimizing trauma, preventing contraction, and maintaining proper alignment.

An example of the present subject matter addresses some of these challenges. One example includes a shape memory material that has a first physical configuration at a first temperature and a second physical configuration at a second temperature. One example includes a first ring and a second ring affixed together at a joint and the joint is configured to allow one ring to articulate relative to the other ring and configured to provide structural rigidity sufficient to support the tissue. One example includes a joint having a grasping portion to allow manipulation using forceps. One example includes a tool attachment feature to allow manipulation of a portion of a leading edge of a ring.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
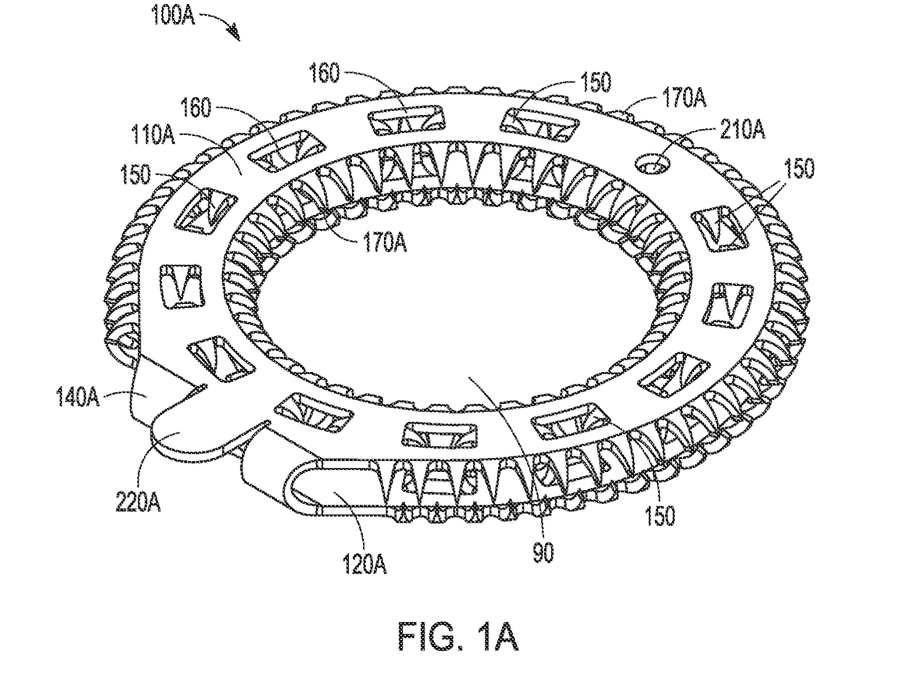
FIGS. 1A and 1B include isometric views of a device, according to one example.
Figure 1B:
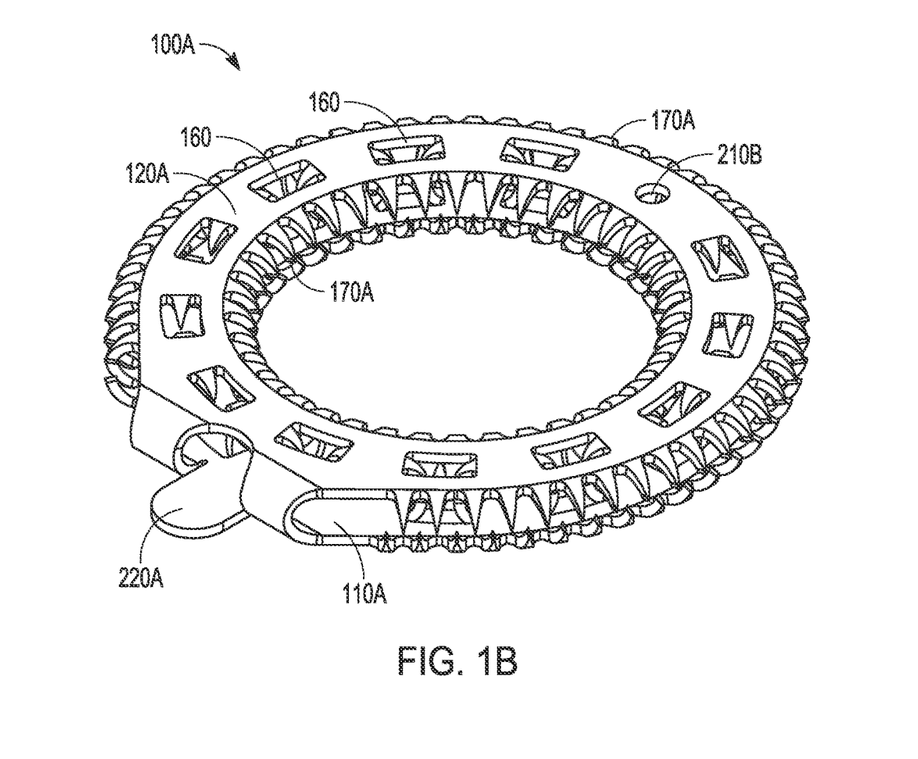

FIGS. 1A and 1B include isometric views of device 100A, according to one example. Device 100A can be fabricated of sheet stock, such as a metal or a polymer. Device 100A includes first ring 110A and second ring 120A coupled together by joint 140A. First ring 110A and second ring 120A each have an open center, as shown at aperture 90, and inner edge and outer edge. In the example shown, both inner edge and outer edge are configured with teeth 170A. Teeth 170A are curved in an inward direction such that a tissue disposed between first ring 110A and second ring 120A is retained thereby. In addition, both first ring 110A and second ring 120A have a plurality of apertures 160, and in the example shown, each aperture 160 has teeth, here each of which are referred to as bur 150. Bur 150 and teeth 170A engage with the tissue disposed between the rings.

Teeth 170A and burs 150 can be fabricated in a punching operation, a piercing operation, or by a laser cutting and press forming operation.

In the example shown, first tool connector 210A includes an aperture configured to pass through the thickness of first ring 110A (as depicted in FIG. 1A), configured to pass through the thickness of second ring 120A (as shown in FIG. 1B), or pass through one ring only. First tool connector 210A can be sized and positioned to receive a suture or to receive a corresponding tool having a suitable mandrel.

In the example shown, second tool connector 220A is coupled to first ring 110A as depicted in FIG. 1A and is separated from second ring 120A as shown in FIG. 1B. Second tool connector 220A can include a cantilevered tab.

Figure 2:
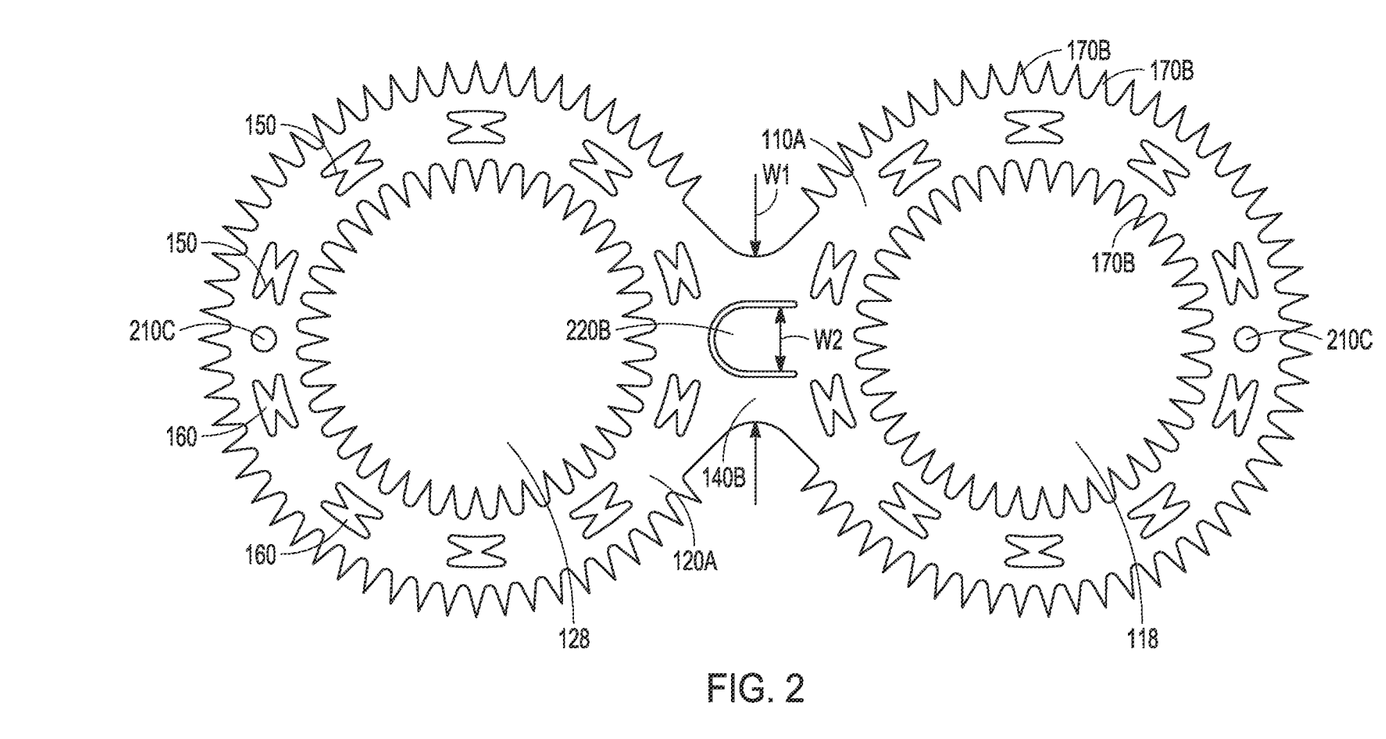
FIG. 2 includes a view of a partially fabricated device, according to one example.

FIG. 2 includes a view of partially fabricated device, according to one example. As shown, the device includes first ring 110A and second ring 120A coupled together by joint 140B. First ring 110A and second ring 120A include teeth 170B distributed about inner edge and outer edge in a sawtooth manner and two burs 150 associated with each aperture 160 within the field of rings 110A and 120A.

During fabrication, the device is cut to a form as shown in the figure. Cutting can include etching, laser cutting, or stamping. Further processing includes forming teeth 170B and burs 150. Teeth 170B and burs 150 can be formed in a press operation or in a combined cutting and forming operation. Teeth 170B and burs 150 are deflected from the plane of the first ring 110A and second ring 120B. First tool connector 210C includes through holes in both first ring 110B and second ring 120B.

In addition, the device fabrication process includes folding at joint 140B. The device shown illustrates joint 140B having second tool holder 220B configured to couple with first ring 110A and separate from second ring 120A. When folded as depicted in the figures, the major apertures of first ring 110A and second ring 120A are aligned.

Joint 140B has a width depicted here as W1 and second tool connector 220B has a width depicted here as W2. The joint resiliency is a function of the difference between dimensions W1 and W2. The clamping force exerted on tissue disposed between first ring 110A and second ring 120A is determined, in part, by the difference between dimensions W1 and W2.

Figure 3:
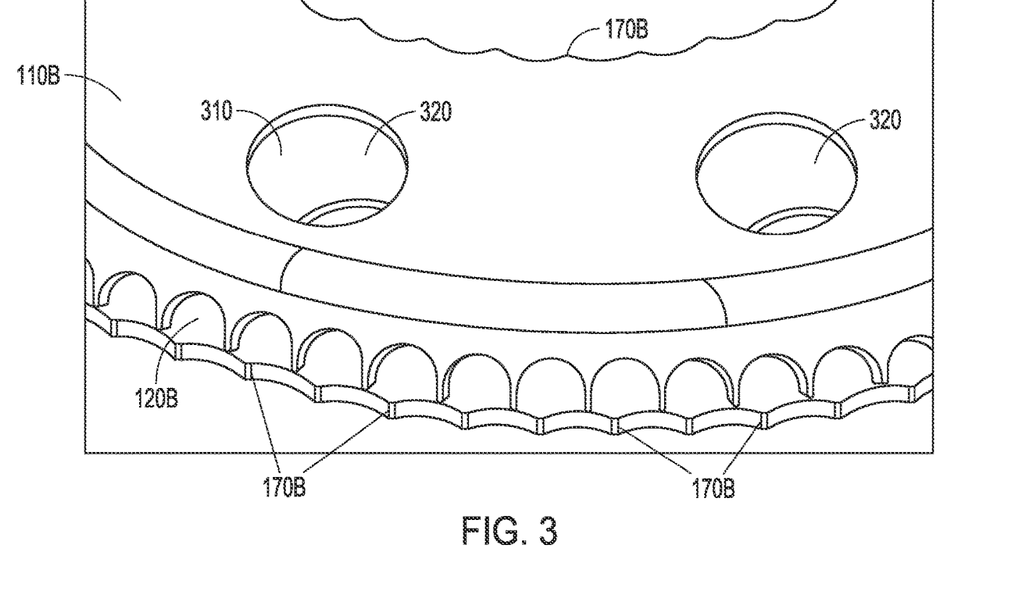
FIG. 3 includes a view of a portion of a device, according to one example.

FIG. 3 includes a view of a portion of a device, according to one example. The figure illustrates first ring 110B aligned atop second ring 120B. Second ring 120B has surface treatment 310. Surface treatment 310 can include a formed texture, roughness, a coating, or other agent to facilitate bonding of tissue and the device. Surface treatment 310 can be applied to inside surface of first ring 110B. First ring 110B includes holes 320. Holes 320 have exposed edges that can assist in bonding tissue and the device. First ring 110B and second ring 120B include teeth 170B distributed on both inner edges and outer edges. In the example shown, teeth 170B have a slender profile and a circular gullet. Other profiles are also contemplated including a rectangular profile of castellations.

Figure 4:
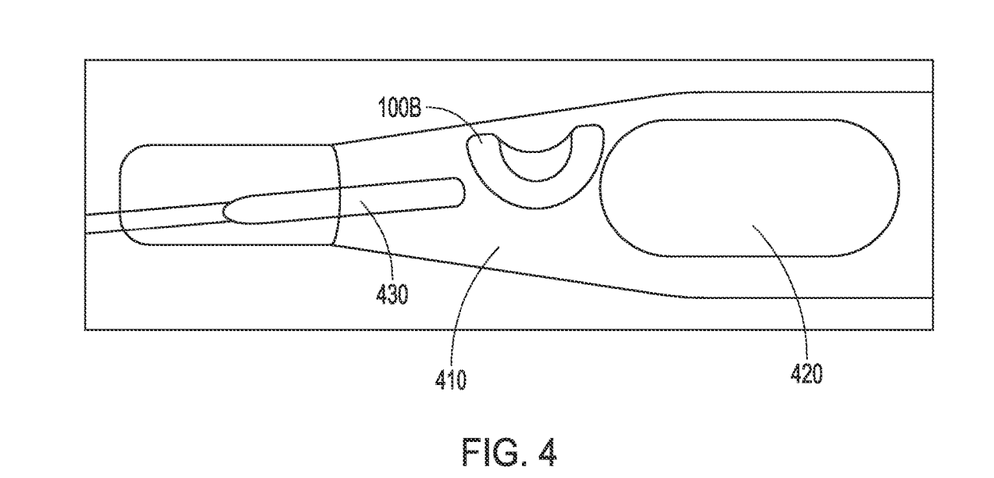
FIG. 4 includes a view of a device during a surgical procedure, according to one example.

FIG. 4 includes a view of device 100B during a surgical procedure, according to one example. Device 100B is shown to be loosely folded in a manner resembling a formed taco. Device 100B is shown inside of a lumen of introducer 410. For device deployment, rubber stopper 420 is urged in a direction to eject device 100B from introducer 410 and into an eye.

In addition, tool 430 can be manipulated by a user to facilitate a surgical procedure. Tool 430, in the example shown, has a flat portion akin to a blade or spatula. In one example, an end of a needle or wire can be flattened along a portion of a length. Tool 430 can be useful for folding device 100B into the configuration shown. In addition, tool 430 can be manipulated to engage with a suture and facilitate removal from within introducer 410. An edge of tool 430 can be maneuvered to exert a pulling force on a suture (or other structure of device 100B) in order to extract device 100B from within introducer 410.

Figure 5:
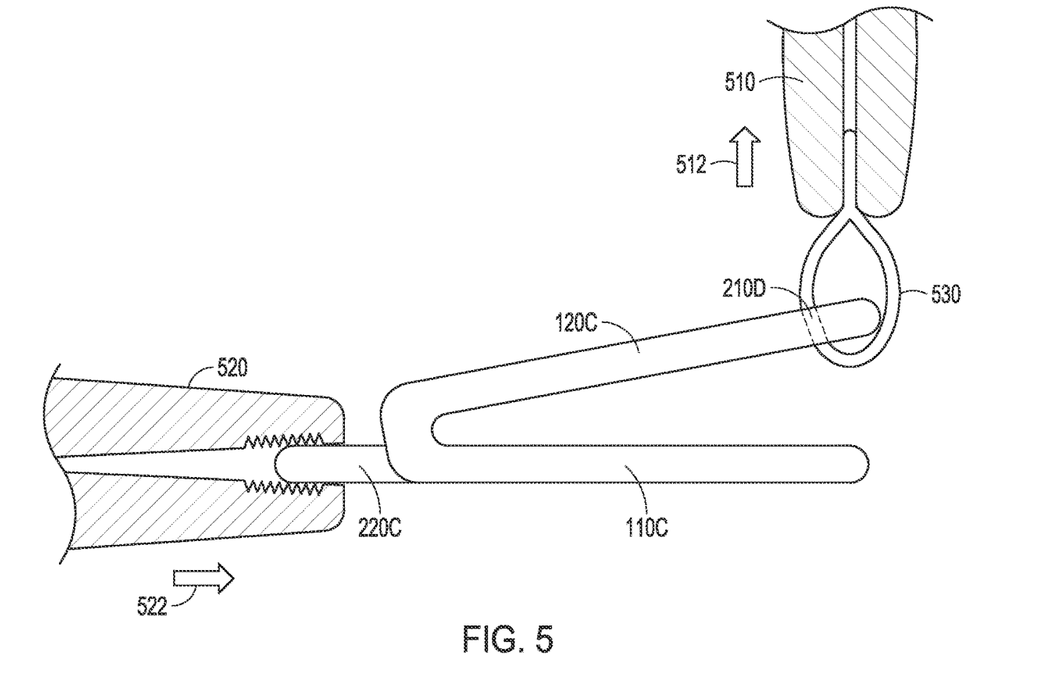
FIG. 5 includes a view of a device during a surgical procedure, according to one example.

FIG. 5 includes a view of a device during a surgical procedure, according to one example. In this view, forceps 510 engage with suture 530. Suture 530 passes through aperture 210D, here shown through second ring 120C. Suture 530 facilitates tugging the device into position on the tissue site. During placement of the device at a tissue site, forceps 510 are urged in a direction indicated by arrow 512. After manipulating to a tissue site, the force exerted by forceps 510 is relaxed and a clamping force is exerted on the tissue by the action of the joint coupling first ring 110C and second ring 120C.

Forceps 520 are engaged with second tool connector 2200. Forceps 520 can be moved in the direction shown by arrow 522 to engage the device with tissue at a target site. Forceps 520 can also facilitate alignment of the plane of the device with that of the tissue.

In one example, a single suture passes through aperture 210D in second ring 120C.

In one example, a first suture passes through apertures of both first ring 110C and second ring 120C and a second suture passes through aperture 210D in second ring 120C. In a surgical procedure, the first suture (passing through both rings) can be engaged by a tool, such as tool 430, for withdrawal, and after exiting the introducer 410, the first suture is removed by a cutting operation. Thereafter, the remaining suture is manipulated as shown in the figure.

Figure 6:
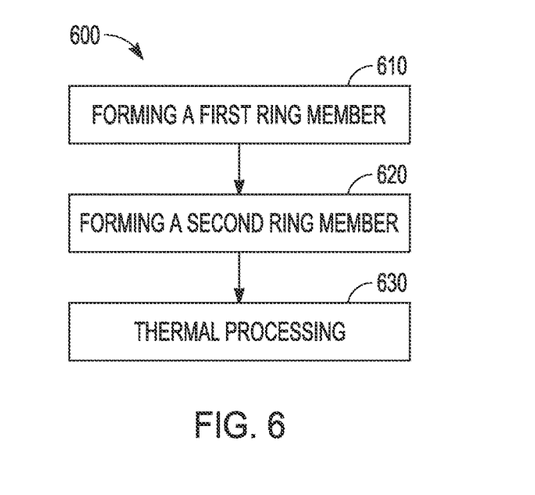
FIG. 6 includes a view of a flowchart of a manufacturing method, according to one example.

FIG. 6 includes a view of a flowchart of manufacturing method 600, according to one example. At 610, method 600 includes forming a first ring member. First ring member can be fabricated by stamping, laser cutting, etching, photolithography, molding, diecasting, or other fabrication process involving additive or subtractive manufacturing equipment. In one example, this can include forming a shape memory allow.

At 620, method 600 includes forming a second ring member. Second ring member can be fabricated by stamping, laser cutting, etching, photolithography, molding, diecasting, or other fabrication process involving additive or subtractive manufacturing equipment. In one example, this can include forming a shape memory allow.

At 630, method 600 includes thermal processing. Thermal processing can include heating, cooling, quenching, soaking, and other manufacturing techniques to impart a memory function to the device. For example, thermal processing can including various combinations of heating and cooling whereby the finished device can be deflected from a natural configuration and when the device temperature returns to a normal body temperature, the device reverts to a configuration in which the first ring member and the second ring member are clamped on a membrane of tissue.

VARIOUS NOTES

A device as described herein can be fabricated of a variety of different materials. In one example, a device includes a metal structure. The metal can include an alloy of stainless steel, titanium, or nitinol. In one example, the device includes a polymer. A polymer can be configured to have a shape memory aspect. The device can be fabricated by stamping, diecasting, laser cutting, etching, or other manufacturing technique.

Fabrication can include treatment using a thermal processing to impart a thermal memory property whereby at a first temperature, the device is urged to take on a first configuration and at a second temperature (different than the first temperature), the device is urged to take on a second configuration. In one example, the first configuration is folded as shown in FIGS. 1A and 1B, and in a second configuration, the device is partially folded or fully open as in FIG. 2.

The first ring can be described as an anterior ring and the second ring can be described as a posterior ring. The posterior ring can be configured with a tab at the joint for manipulating the device. In one example both the anterior ring and the posterior ring have a formed tab at the joint in which forceps can be used to draw together a portion of the tabs and thereby cause the leading edge of the rings to open in the manner of a chip clip. The dimensions of the joint can be selected to adjust the clamping force exerted by the device.

A device includes an apparatus or a fixture having a first ring member and a second ring member. The first ring member can have a first open center. The first ring member can include a first tool connector disposed at a first radial position relative to the first open center. The second ring member can have a second open center coupled to the first ring member at a joint. The joint is disposed at a second radial position relative to the first open center. The joint can have a second tool connector. The joint can be configured to enable movement of the first ring member relative to the second ring member.

The first ring member, the second ring member, and the joint can include a shape memory material.

The first ring member and the second ring member can include a shape memory metal.

In one example, the first ring member and the second ring member have a profile that is configured to substantially conform to a radius of greater than 2 cm.

In one example, the first radial position differs from the second radial position. For example, the first radial position and the second radial position can be separated by substantially 180 degrees.

In one example, the first open center and the second open center have a substantially similar diameter.

The first tool connector or the second tool connector can include a hole, a knob, and a notch.

The second tool connector can be configured to articulate with the second ring member.

In one example, the joint includes a hinge. The hinge can include an elastic element or can include a pivot configuration and other portions of the device can include a locking member to retain the first ring member in a fixed position relative to the second ring member.

In one example, either or both of the first ring member and the second ring member includes a perforation. The perforation can include a pierced aperture or a die-formed bur. In one example, a plurality of perforations are provided.

In various examples, the first ring member or the second ring member includes a tooth or a castellation at an edge. The tooth or castellation can be disposed at an inner edge or disposed at an outer edge. In one example, the edge (such as an inner edge or an outer edge) includes a sawtooth profile.

The edges (such as the inner edge or outer edge) can have points that are aligned or staggered.

One example of the present subject matter includes a method of manufacturing a fixture. The method can include forming a first ring member having a first open center and having a first tool connector disposed at a first radial position relative to the first open center. The method can include forming a second ring member having a second open center coupled to the first ring member at a joint. The joint can be disposed at a second radial position relative to the first open center. The joint can have a second tool connector.

The manufacturing method can include forming a shape memory material. This can include forming a first configuration corresponding to a first temperature and forming a second configuration corresponding to a second temperature. Fabrication can include fabricating using a shape memory metal. Fabrication can also include cutting and forming sheet stock. Forming can include forming a hole disposed at a first radial position or forming a tab at a second radial position. In one example, the method includes fabricating a joint, wherein the joint is configured to articulate with the second ring member. In one example, forming includes providing at least one perforation, providing at least one castellation at an edge, or providing at least one sawtooth profile at an edge.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A fixture comprising:
a first ring member having a first open center and having a plurality of apertures that extend therethrough, wherein the plurality of apertures are spaced around a circumference of the first open center; and
a second ring member having a second open center and having a plurality of apertures that extend therethrough, wherein the plurality of apertures are spaced around a circumference of the second open center, wherein the second ring member is coupled to the first ring member at a joint, the joint disposed at a second radial position relative to the first open center, the joint having a second tool connector, the joint configured to enable movement of the first ring member relative to the second ring member;
wherein the plurality of apertures of the first ring member are generally aligned with the plurality of apertures from the second ring member when the first ring member and the second ring member are positioned in a clamping configuration and
wherein the first ring member and the second ring member includes at least a tooth or a castellation disposed at an inner edge forming one of the first open center or the second open center and disposed at an outer edge that is an outer perimeter of the first ring member or the second ring member.

2. The fixture of claim 1 wherein at least one of the first ring member, the second ring member, and the joint includes a shape memory material.

3. The fixture of claim 1 wherein at least one of the first ring member and the second ring member includes a shape memory metal.

4. The fixture of claim 1 wherein at least one of the first ring member and the second ring member has a profile that is configured to substantially conform to a radius of greater than 2 cm.

5. The fixture of claim 1 wherein the first ring member has a first tool connector disposed at a first radial position relative to the first open center, and wherein the first radial position differs from the second radial position.

6. The fixture of claim 1 wherein the first ring member has a first tool connector disposed at a first radial position relative to the first open center, and wherein the first radial position differs from the second radial position by approximately 180 degrees.

7. The fixture of claim 1 wherein the first open center and the second open center have a substantially similar diameter.

8. The fixture of claim 1 wherein the first ring member has a first tool connector disposed at a first radial position relative to the first open center, and wherein the first tool connector includes at least one of a hole, a knob, and a notch.

9. The fixture of claim 1 wherein the second tool connector includes at least one of a tab, a hole, and a notch.

10. The fixture of claim 1 wherein the second tool connector is configured to articulate with the second ring member.

11. The fixture of claim 1 wherein the joint includes a hinge.

12. The fixture of claim 1 wherein one or more of the plurality of apertures of the first ring member or the second ring member includes a bur.

13. The fixture of claim 1 wherein the first ring member or the second ring member includes a tooth or a castellation at an edge that forms one of the first open center or the second open center.

14. The fixture of claim 1 wherein the first ring member or the second ring member includes a sawtooth profile at an edge that forms one of the first open center or the second open center.

15. A fixture comprising:
a first ring member having a first open center and having a first inner edge forming the first open center and a first outer edge that is an outer perimeter of the first ring member opposing the first inner edge; and
a second ring member having a second open center and having an second inner edge forming the second open center and a second outer edge that is an outer perimeter of the second ring member opposing the second inner edge, wherein the second ring member is coupled to the first ring member at a joint, the joint disposed at a second radial position relative to the first open center, the joint having a second tool connector, the joint configured to enable movement of the first ring member relative to the second ring member, wherein the first ring member and the second ring member includes a sawtooth profile at the first inner edge and the second inner edge and at the first outer edge and the second outer edge.

16. The fixture of claim 1 wherein an edge of the first ring member includes a first point and an edge of the second ring member includes a second point and wherein the first point is aligned with the second point.

17. A method of manufacturing a fixture, the method comprising:
forming a first ring member having a first open center and having a plurality of apertures that extend therethrough, wherein the plurality of apertures are spaced around a circumference of the first open center at a plurality of radial positions; and
forming a second ring member having a second open center and having a plurality of apertures that extend therethrough, wherein the plurality of apertures are spaced around a circumference of the second open center at a plurality of radial positions, wherein the second ring member is coupled to the first ring member at a joint, the joint disposed at a second radial position relative to the first open center, the joint having a second tool connector; and
orienting the first ring member and the second ring member via the joint such that the plurality of apertures of the first ring member are generally aligned with the plurality of apertures from the second ring member;
wherein forming includes providing at least one sawtooth profile along all of: an inner edge that defines of the first open center, an inner edge that defines the second open center, an outer edge that is an outer perimeter of the first ring member facing away from the first open center and an outer edge that is an outer perimeter of the second ring member facing away from the second open center.

18. The method of claim 17 wherein forming includes fabricating using a shape memory material.

19. The method of claim 17 wherein fabricating using a shape memory material includes forming a first configuration corresponding to a first temperature and forming a second configuration corresponding to a second temperature.

20. The method of claim 17 wherein forming includes cutting a shape memory metal.

21. The method of claim 17 wherein forming includes cutting sheet stock.

22. The method of claim 17 wherein forming the first ring member includes forming a first tool connector disposed at a first radial position relative to the first open center with the first tool connector being a hole disposed at the first radial position.

23. The method of claim 17 wherein forming the second ring member includes forming a tab at the second radial position.

24. The method of claim 17 wherein forming includes fabricating the joint, wherein the joint is configured to articulate with the second ring member.

25. The method of claim 17 wherein forming includes providing at least one perforation.

26. The method of claim 17 wherein forming includes providing at least one castellation at an edge forming one of the first open center or the second open center.

27. The method of claim 17 wherein forming includes providing at least one sawtooth profile at an edge that defines one of the first open center or the second open center or at an edge that is an outer perimeter of the first ring member or the second ring member.

28. The fixture of claim 1 wherein the first ring member or the second ring member includes a tooth or a castellation at an edge that forms an outer perimeter of the first ring member facing away from the first open center or at an edge that forms an outer perimeter of the second ring member facing away from the second open center.

* * * * *